UNITED STATES PATENT OFFICE.

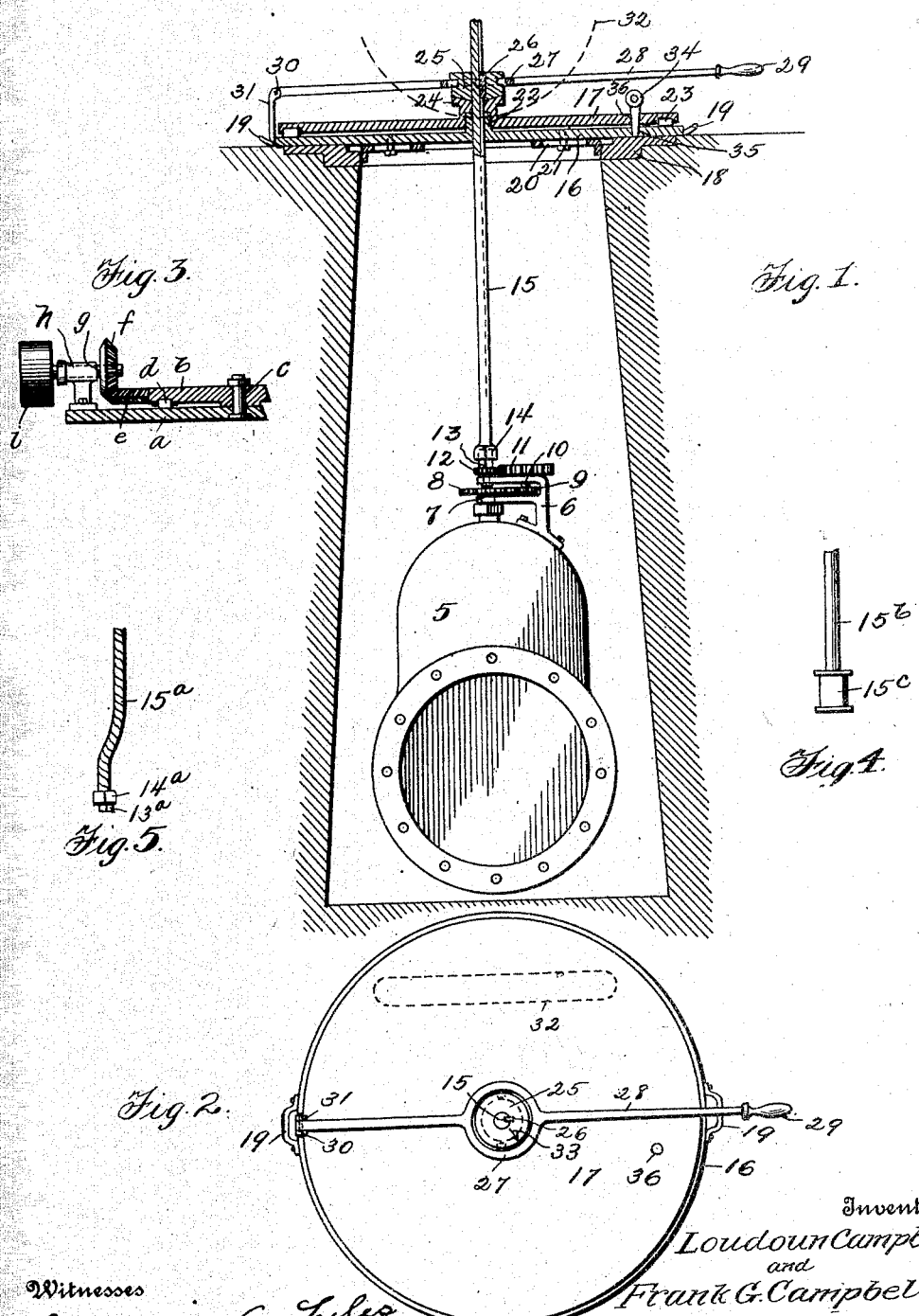

LOUDOUN CAMPBELL AND FRANK G. CAMPBELL, OF ALEXANDRIA, VIRGINIA.

POWER-TRANSMISSION DEVICE.

1,174,227.     Specification of Letters Patent.     Patented Mar. 7, 1916.

Application filed February 4, 1913. Serial No. 746,151.

*To all whom it may concern:*

Be it known that we, LOUDOUN CAMPBELL and FRANK G. CAMPBELL, citizens of the United States of America, residing at Alexandria, in the county of Alexandria and State of Virginia, have invented certain new and useful Improvements in Power-Transmission Devices, of which the following is a specification.

This invention relates to a power transmission mechanism and has for its object, the provision of an article of this character by which power may be transmitted from the power plant of a motor vehicle to other machines.

The invention is particularly adapted for use in closing large valves such as are commonly employed in conjunction with the water mains of cities, though it is adapted for use in many other relations as hereinafter set forth.

In the accompanying drawing, Fig. 1 is a view partly in side elevation and partly in section of a power transmission mechanism showing the same used to close a large valve, Fig. 2 is a plan view of the structure shown in Fig. 1, Fig. 3 illustrates a flexible shaft hereinafter described, and Figs. 4 and 5 show modifications hereinafter described.

Like numerals designate corresponding parts in all of the figures of the drawing.

Referring to the drawing, it will be seen that means are here provided for operating one of the large valves commonly employed in water mains of cities. These valves are gate valves and are of such size that the task of opening and closing them is a very slow and laborious one and it is the object of the invention shown in these figures, to provide ready means whereby the power plant of an automobile or motor truck may be utilized to open or close these valves.

5 designates the casing of a gate valve which carries a bracket 6. Stem 7 of the valve carries a gear wheel 8 which meshes with a pinion 9 which is fast upon a shaft 10. This shaft carries a gear wheel 11 that meshes with a pinion 12 and this latter pinion has an angular extension 13 for engagement with a key 14 of an operating rod 15. This operating rod extends upwardly through a pair of disks 16 and 17. The lower of these disks, viz., 16 is stationary, and rests upon the manhole cover 18. This disk is provided with handles 19 for its easy manipulation. To prevent this disk from accidentally shifting its position, slotted plates 20 are secured to its under side by bolts 21 and these plates may be adjusted to fit the size of the particular manhole cover in conjunction with which the device is to be used. The disk 16 has a neck extension 22 which forms a central bearing for the upper disk 17 and this upper disk carries upon its lower face, rollers 23 or like anti-friction elements to adapt this upper disk to have rotative movement with relation to the lower disk. This upper disk carries one of the members 24 of a friction clutch, the other member 25 of this friction clutch being splined by means of a key 26 to the operating rod 15. A yoke 27 is carried by the operating lever 28, this operating lever being provided with a handle 29. The opposite end of the operating lever is pivoted at 30 to a bracket 31 carried by the lower disk. It is manifest, therefore, that if this handle 29 be pressed upon to force the movable member 25 of the friction clutch into engagement with the fixed member 24, any rotative motion of disk 17 will be imparted to the operating rod 15 and consequently to the valve stem 7 to open or close the valve.

For imparting rotation to disk 17, one of the rear or driving wheels of an automobile or motor truck indicated at 32, may be run upon said disk. If then, the automobile engine be started and thrown into gear with this driving wheel, it is apparent that rotation will be imparted to disk 17 to close the valve, this being accomplished by pressing upon handle 29 to clutch the member 25 to the member 24. That the operator may determine the number of revolutions that have been imparted to the operating rod, the member 25 may be provided with an arrow indicated at 33 so that the number of revolutions of the clutch member 25 may be counted. A pin 34 may be placed in position indicated in Fig. 1 that is traversing openings 35 and 36 of the disks 16 and 17. This locks these disks together. It is to be understood that this pin is only placed in position during the time the automobile is being run upon disk 17 and this pin is for the purpose of holding the upper disk stationary at this time. After the automobile is properly positioned, this pin is to be removed.

While the structure shown in Figs. 1 and 2 is well adapted for use in closing valves, it is apparent that the two horizontally arranged disks, the lower one fixed and the upper one rotative with relation thereto and adapted to have the driving wheel of an automobile run directly thereon, may be utilized for other purposes.

Fig. 3 illustrates a lower disk *a* and an upper disk *b*, pivotally mounted at *c* with relation to disk *a*. Anti-friction devices such as rollers *d* provide a rolling bearing for the upper disk upon the lower disk. The edge of disk *b* is formed as a bevel gear *e* which meshes with a bevel pinion *f*. This pinion is mounted upon a stub shaft *g* supported in a bracket *h*. The stub shaft carries a pulley *i*. It is apparent that by virtue of this structure, an automobile may be utilized to impart rotation to the pulley *i* and to thereby drive any desired machine through the medium of a belt, not shown.

Fig. 3 illustrates an operating rod 15$^a$, the lower end of which is in the form of a spiral or coil to render the lower end of this rod a flexible one. In this case, the key 14$^a$ is adapted to engage with the angular member 13$^a$ of a valve that is set off to one side of the manhole.

The structure shown in Figs. 1 and 2 may likewise be utilized to draw electric cables through conduits and in this case the rod 15$^b$ which in other respects corresponds to rod 15, is provided upon its lower end with a spool 15$^c$. It is apparent that upon taking a turn of the cable or wire around this spool, rotation of the spool will draw the wire or cable steadily through the conduit.

We are aware of the fact that it has heretofore been proposed to utilize the power plants of automobiles to actuate other machines, but so far as we are aware we are absolutely the first to utilize the power plant of a motor truck, such as are usually employed by the water departments of cities, and to provide connections between said truck and a gate valve located in a man hole below the surface of a street, whereby to open or close said valve under the power of said truck.

While the elements shown and described are well adapted to serve the purposes for which they are intended, it is to be understood that the invention is not limited to the precise construction set forth, but includes within its purview such changes as may be made within the scope of the appended claims.

Having described our invention, what we claim is:

1. In a power transmission mechanism, the combination with a fixed lower supporting member adapted and arranged to rest upon the ground, of a rotative member mounted upon said fixed supporting member arranged to rotate in a horizontal plane and in such manner that the driving wheel of an automobile may run thereupon to impart rotation thereto, a driven member and means for driving said driven member from said horizontally rotative member.

2. In a power transmission mechanism, the combination with a fixed lower supporting member adapted and arranged to rest upon the ground, of a rotative member mounted upon said fixed supporting member arranged to rotate in a horizontal plane and in such manner that the driving wheel of an automobile may run thereupon to impart rotation thereto, a driven member and means for driving said driven member from said horizontally rotative member, said fixed lower member constituting a trackway upon which said horizontally rotative member travels.

3. In a device of the character described, the combination with a supporting element forming a horizontally disposed trackway, of a horizontally disposed rotative member pivoted to said supporting element at its center, roller bearings disposed between said trackway and said rotative member, a power transmitting driven member and a clutch mechanism between said driven member and said rotative member.

4. In a power transmission mechanism, the combination with a fixed lower supporting member adapted and arranged to rest upon the ground of a rotative member mounted upon said fixed supporting member arranged to rotate in a horizontal plane and in such manner that the driving wheel of an automobile may run thereupon to impart rotation thereto, a driven member and means for driving said driven member from said horizontally rotative member, said fixed lower member constituting a trackway upon which said horizontally rotative member travels, and anti-friction devices disposed between said horizontally rotative member and the trackway formed by said lower fixed member.

5. A device of the character described comprising a fixed lower member and a horizontally rotative upper member said horizontally rotative member being centrally pivoted to said lower fixed member, a driven member supported from said lower fixed member means for driving said driven member from said horizontally rotative member, said horizontally rotative member being adapted and arranged to have the driving wheel of an automobile run thereon to impart rotation thereto while the lower fixed member rests upon the ground and said fixed lower member constituting a trackway upon which the horizontally rotative member travels.

6. A device of the character described comprising a fixed lower member adapted to rest upon the ground, to present a horizontal trackway, a horizontally rotative disk pivoted to said fixed lower member at its center anti-friction devices disposed between said disk and the trackway formed by the lower fixed member, a driven member supported from said fixed lower member and driven from said horizontally rotative disk, said horizontally rotative disk being adapted and arranged to have the driving wheel of an automobile run thereon to impart motion thereto.

7. In a device of the character described the combination with a fixed lower member adapted and arranged to rest directly upon the ground and to present a horizontal trackway, a rotative disk having pivotal engagement with said member at the center thereof, anti-friction devices disposed between said disk and the trackway of said fixed lower member, a driven member and manually operable means for bringing said driven member into engagement with said disk to impart rotation thereto from said disk.

8. In a device of the character described the combination with a fixed lower member adapted to rest upon the ground in a horizontal position and to present a horizontal trackway, of a rotative disk pivoted thereto to rotate thereon, anti-friction devices disposed between said disk and said fixed lower member, a friction clutch element, a driven member engaged with said friction clutch element, manually operated means for bringing said clutch element into engagement with said horizontally rotative disk to thereby drive said driven member from said disk.

9. In a device of the character described, the combination with an elongated operating rod, arranged to engage the operating mechanism of a gate valve located below the surface of a street, and of sufficient length to project above the surface of the street, of a self-propelled vehicle and means engaging a moving part of said self-propelled vehicle and said operating rod arranged to impart movement to said rod from said moving part of the vehicle for the purpose of opening or closing said valve from the power of said vehicle.

10. In a device of the character described, the combination with a valve located below the surface of a street of a horizontally rotative operating member for said valve, a self-propelled vehicle and means for driving said operating member from a moving part of said self-propelled vehicle, to thereby open or close the valve from the power plant of said vehicle, when said vehicle stands upon the street.

11. In a device of the character described, the combination with a valve located in a man hole and below the surface of a street, of an operating member for said valve, a self-propelling vehicle and mechanism adapted to be supported upon the surface of the ground and over said man hole, and engaging said operating member, said mechanism being adapted and arranged to be engaged by a moving part of the self-propelled vehicle to thereby open and close the valve from the power plant of said vehicle.

12. In a device of the character described, the combination with a valve located in a man hole and below the surface of a street, of an operating member for said valve, a self-propelled vehicle and mechanism adapted to be supported upon the surface of the ground and over said man hole, and engaging said operating member, said mechanism being adapted and arranged for engagement with one of the driving wheels of said vehicle.

13. In a device of the character described, the combination with a valve located in a man hole, of a vertically disposed rotative rod arranged to engage the operating mechanism of said valve, a horizontally rotative member engaging said rod, and a self-propelled vehicle comprising a vertically rotated member and means for driving said horizontally rotative member from said vertically rotated member.

14. In a device of the character described, the combination with a valve located in a man hole, of a vertically disposed rotative rod arranged to engage the operating mechanism of said valve, a horizontally rotative member engaging said rod and a self-propelled vehicle, comprising a vertically rotated member and means for driving said horizontally rotative member from said vertically rotated member, there being a friction clutch interposed between the horizontally rotative member and the operating member to provide a yielding drive therebetween.

15. In a device of the character described, the combination with a valve located below the surface of the ground, of an operating rod which projects above the surface of the ground, a self-propelled vehicle and means including a friction drive for establishing driving communication between a moving part of said self-propelled vehicle and said operating member.

16. In a device of the character described, the combination with a valve located in a man hole below the surface of the ground, of an operating rod adapted for engagement with the operating mechanism of the valve, said rod projecting above the surface of the ground, a fixed supporting member adapted to rest upon the ground and over the manhole, a horizontally rotative member, mounted upon said support and arranged to impart movement to said operating member, and a self-propelled vehicle arranged to impart movement to said horizontally rotative member from a moving part of said vehicle.

In testimony whereof we affix our signatures in presence of two witnesses.

LOUDOUN CAMPBELL.
FRANK G. CAMPBELL.

Witnesses:
ANNA M. MURRAY,
EDWIN S. CLARKSON.